Figure 1:
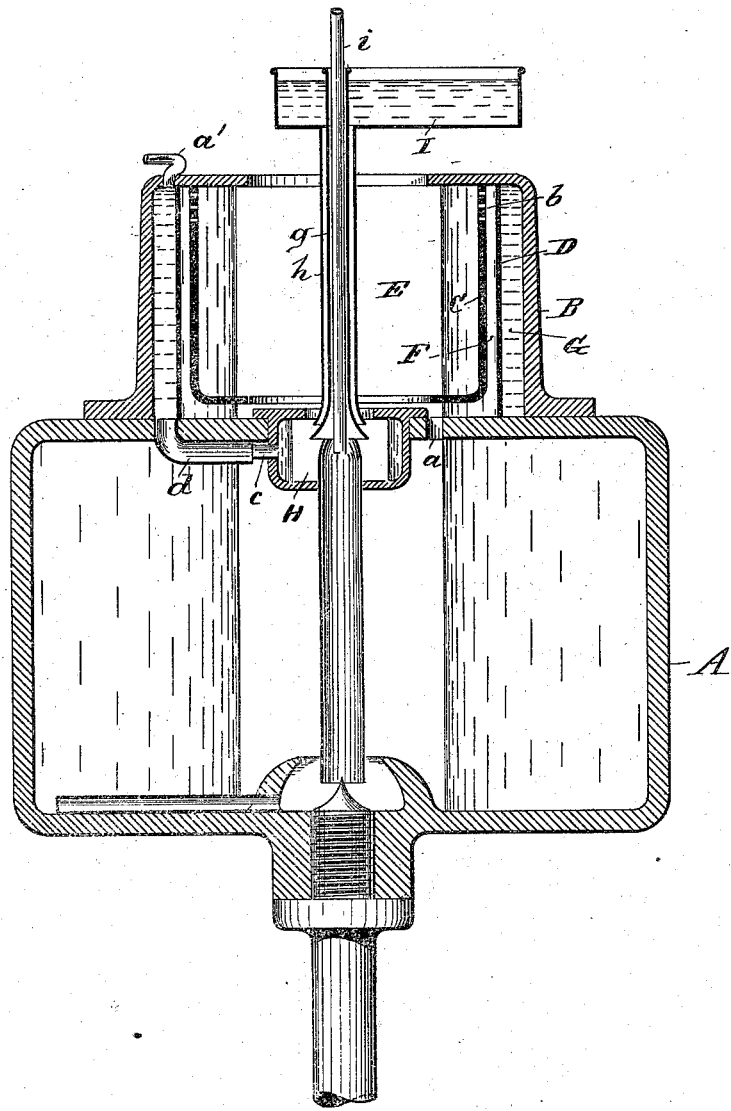

(No Model.) 2 Sheets—Sheet 1.

E. G. N. SALENIUS.
CENTRIFUGAL LIQUID SEPARATOR.

No. 559,065. Patented Apr. 28, 1896.

Witnesses:
Herbert Blossom
Peter A. Ross

Inventor:
Erik G. N. Salenius
by Henry Connett
Attorney (No Model.) 2 Sheets—Sheet 2.
E. G. N. SALENIUS.
CENTRIFUGAL LIQUID SEPARATOR.
No. 559,065. Patented Apr. 28, 1896.
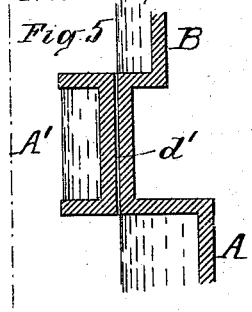
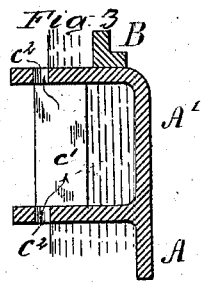
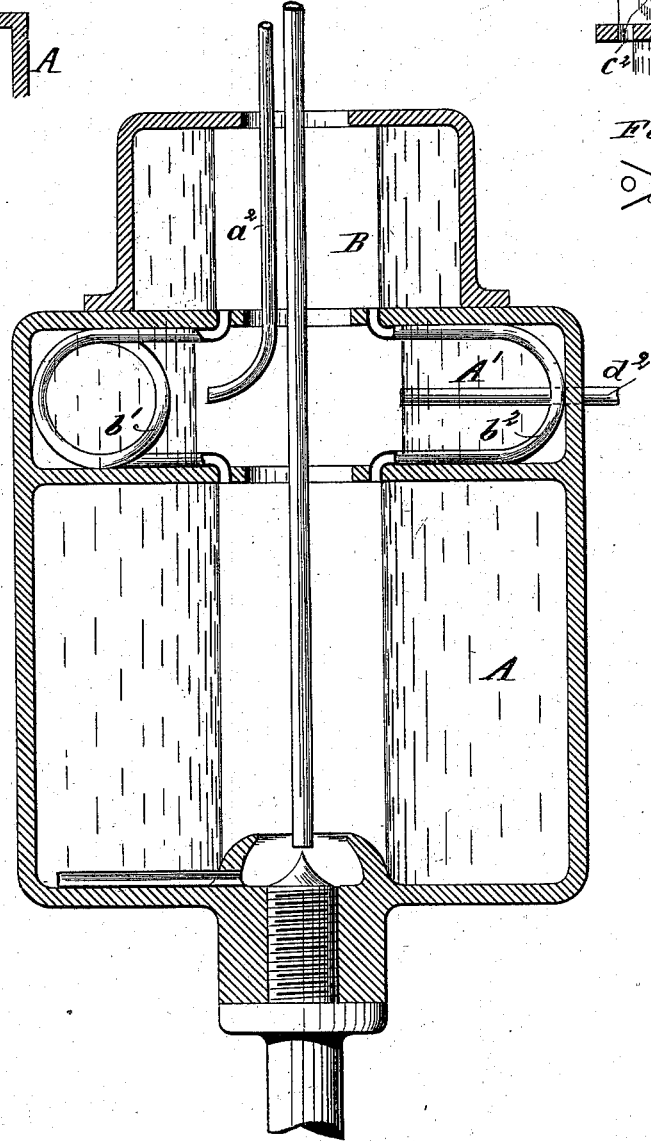
Witnesses:
Herbert Blossom
Peter A. Ross
Inventor:
Erik G. N. Salenius
by Henry Connett
Attorney

United States Patent Office.

ERIK GUSTAF NICOLAUS SALENIUS, OF STOCKHOLM, SWEDEN.

CENTRIFUGAL LIQUID-SEPARATOR.

SPECIFICATION forming part of Letters Patent No. 559,065, dated April 28, 1896.

Application filed February 8, 1892. Serial No. 420,666. (No model.) Patented in Sweden October 24, 1891, No. 3,737 and No. 3,821; in France November 27, 1891, No. 217,709; in England December 1, 1891, No. 20,959; in Norway December 2, 1891, No. 2,988 and No. 2,989; in Belgium December 17, 1891, No. 97,607; in Victoria June 24, 1892, No. 9,752; in New South Wales June 27, 1892, No. 3,829; in Austria-Hungary November 2, 1892, No. 19,146 and No. 42,058; in Queensland September 4, 1893, No. 2,132, and in Finland September 26, 1893, No. 480.

*To all whom it may concern:*

Be it known that I, ERIK GUSTAF NICOLAUS SALENIUS, a subject of the King of Sweden and Norway, and a resident of Stockholm, Sweden, have invented an Improved Centrifugal Apparatus, (for which patents have been granted to me in Sweden, No. 3,737 and No. 3,821, dated October 24, 1891; in France, No. 217,709, dated November 27, 1891; in Norway, No. 2,988 and No. 2,989, dated December 2, 1891; in Great Britain, No. 20,959, dated December 1, 1891; in Austria-Hungary, No. 19,146 and No. 42,058, dated November 2, 1892; in Belgium, No. 97,607, dated December 17, 1891; in Victoria, No. 9,752, dated June 24, 1892; in New South Wales, No. 3,829, dated June 27, 1892; in Queensland, No. 2,132, dated September 4, 1893, and in Finland, No. 480, dated September 26, 1893,) of which the following is a specification.

My invention relates to a centrifugal apparatus, and especially to such apparatuses when employed in treating milk for separating the cream or butter or both from milk.

The drum of the centrifuge used for first separating the cream from the milk, known as "separating," and then separating the butter from the cream, known as "churning," is generally divided into two sections—one intended for the separating operation and the other for the churning operation. In proportion as the cream is separated in one section it is led into the other section in order to be churned or the butter separated from it. As the temperature most suitable for churning is lower than that most suitable for separating, it is advantageous to refrigerate the cream just as it is led into the section used for churning. The object of my invention is to effect this refrigeration, but it is contemplated also to refrigerate the cream, even though the latter should not be churned into butter, as a lowering of the temperature of the cream is advantageous for its conservation. In carrying out the refrigeration, I cause a current of cold liquid or medium, as cold water, to circulate about the inner wall of the section of the drum in which the churning is effected and about the conduit which leads the cream to the said section. This may be effected by the means to be hereinafter described.

In the drawings which serve to illustrate my invention, Figure 1 is a sectional elevation of a compound drum centrifuge embodying my improvements. Fig. 2 is a similar sectional elevation of another form of centrifuge embodying my improvements. Figs. 3, 4, and 5 are detail views that will be referred to hereinafter.

Referring, primarily, to Fig. 1, A represents the section of the drum in which the cream is separated from the milk, and B represents the section in which the butter is separated from the cream. The section B has triple walls, the outer wall and the inner walls C and D. E is the central compartment of the section B. F is an intermediate concentric compartment between the walls C and D, and G is an outer concentric compartment adjacent to the outer wall of the drum. This compartment G receives the refrigerating liquid, and the compartment F serves as a passage through which the cream flows to the central compartment. The wall C does not extend quite down to the bottom of the upper section B of the drum, and its lower edge is turned inward horizontally, so that the cream, mounting to the upper section B through the apertures $a$, can enter the middle compartment F, up through which it flows, eventually passing into compartment E through the holes $b$ in the upper part of wall C. By this arrangement the cream is made to flow in a thin sheet along the cold wall D and thus be cooled or refrigerated. The cooling liquid enters compartment G through the pipes $c$ and $d$ from a central compartment H, it being led to this latter compartment from an elevated vessel I down through the annular passage between the inner and outer axial tubes $g$ and $h$. The central pipe or tube $i$ leads the milk to the lower section A of the drum. The cooling liquid escapes from the compartment G at the outlet tube or pipe $a'$.

The construction shown in Fig. 1 can be so modified as to omit the inner wall C, in which case the compartments F and G will be separated from each other only by the wall D. Further, the compartments E and G may communicate with each other and the cream may pass into these through pipes while the refrigerating agent is led to and from the compartment F. It is evident that the construction described may also be employed for warming or heating the cream, if desired, and that likewise the cooling or heating agent can be stored in the compartment G instead of being made to flow continuously through it. Of course the section B may constitute the entire drum, the section A being omitted.

In the construction shown in Fig. 2 there is a compartment A' in the drum between the compartments A and B. This compartment A' is filled with refrigerating or heating liquid, which is led into it by the pipe $a^2$. In the compartment A' is a conduit which leads the cream from the section A to the section B. This conduit may have various forms, as, for example, a spiral or coil of pipe $b'$, as seen at the left in Fig. 2, opening at its respective ends into the sections A and B, or, as seen at the right in Fig. 2, it may be a bent or U-shaped pipe $b^2$, opening into and connecting the two sections A and B. In lieu of the pipes $b'$ and $b^2$ a channel open toward the axis of the drum may be used. This is seen in Figs. 3 and 4, where $c'$ is a V-shaped channel extending vertically across the compartment A'. The cream flows from the section A through holes $c^2$, up through channel $c'$, and into section B through other holes $c^2$. Fig. 3 is a section of part of a drum, and Fig. 4 is an end view of the channel $c'$. The conduit for the cream may also pass through the wall of the compartment A, as seen in the fragmentary sectional view, Fig. 5. In this view $d'$ represents the upright conduit for the cream, connecting the sections A and B, and formed in the wall of the compartment A'. This conduit $d'$ may be a series of holes or it may be a narrow concentric passage about the compartment A'.

The pipe $d^2$ (seen in Fig. 2) serves as a discharge-pipe for the contents of the compartment A'.

Having thus described my invention, I claim—

1. In a centrifugal separator adapted for separating cream from milk, the combination with a drum having two compartments wherein different temperatures are to be maintained, of a heat-regulator in one of said compartments adapted to maintain a temperature in that compartment differing from that in the other, substantially as set forth.

2. The combination with a drum having two compartments one above the other, one for milk and the other for the cream separated therefrom, of a receptacle for a heat-regulating substance having heat-conducting walls arranged in said cream-compartment whereby the temperature of said cream is regulated, substantially as and for the purposes set forth.

3. In a centrifugal apparatus, the combination with a drum having two sections, A and B, said section B having walls which divide it into compartments E, F and G, the latter being designed to hold a temperature-regulating agent, said drum having a passage connecting the section A of the drum with the compartment F, and the wall C having apertures at its top communicating between the compartments E and F, of means for supplying the temperature-regulating agent to the chamber G, and means for supplying milk to the drum-section A, substantially as and for the purpose set forth.

4. The combination with the drum of a centrifugal apparatus, said drum being composed of a lower section A and an upper section B, and said upper section being divided circumferentially into a central compartment E, a compartment F, exterior to the latter and communicating therewith at its upper part, an outer compartment G, to contain a temperature-regulating agent, and a centrally-arranged chamber H, of a pipe $d$, connecting the compartment H with the lower part of the compartment G, an outlet-pipe $a'$, at the upper part of compartment G, an elevated vessel to contain a temperature-regulating liquid, a pipe connecting said vessel with the compartment H for supplying the liquid thereto, and means for supplying milk to the section A of the drum, substantially as set forth.

5. In a centrifugal apparatus for separating cream from milk and maintaining different temperatures in the different parts of the separating-drum, the combination with a drum having a lower section A and an upper section B, and having in said upper section an annular, outer compartment G, for the temperature-regulating liquid, an annular compartment F, interiorly arranged with respect to the compartment G, said compartment F communicating at its lower end with the section A and at its upper end with the central compartment of section B, and a centrally-arranged compartment H, in communication with the compartment G, of the axially-arranged pipe for supplying milk to the drum-section A, an elevated vessel to contain the temperature-regulating liquid, and an annular pipe extending down from said vessel to the compartment H, to supply liquid therefrom to said compartment, substantially as set forth.

In witness whereof I have hereunto signed my name in the presence of two subscribing witnesses.

ERIK GUSTAF NICOLAUS SALENIUS.

Witnesses:
ERNST SVANGVIST,
C. W. ERDMAN.